Sept. 15, 1970    J. HENRY-BAUDOT    3,529,191
HOMOPOLAR MACHINE HAVING DISKLIKE ROTOR
Filed March 8, 1968    4 Sheets-Sheet 1

INVENTOR
Jacques Henry-Baudot
BY
Kemon, Palmer & Estabrook
ATTORNEYS

Sept. 15, 1970   J. HENRY-BAUDOT   3,529,191
HOMOPOLAR MACHINE HAVING DISKLIKE ROTOR
Filed March 8, 1968   4 Sheets-Sheet 3

INVENTOR
Jacques Henry-Baudot
BY
Kenyon, Palmer & Estabrook
ATTORNEYS

United States Patent Office 3,529,191
Patented Sept. 15, 1970

3,529,191
HOMOPOLAR MACHINE HAVING DISKLIKE ROTOR
Jacques Henry-Baudot, Antony, France, assignor to Photocircuits Corporation, a corporation of New York
Filed Mar. 8, 1968, Ser. No. 711,787
Claims priority, application France, Mar. 28, 1967, 100,544
Int. Cl. H02k 31/00
U.S. Cl. 310—178    23 Claims

ABSTRACT OF THE DISCLOSURE

A rotary dynamoelectric machine of the flat annular airgap type having a disc-shaped rotor disposed in the airgap and the rotor having a winding in an annular band thereon has a field structure which causes magnetic flux to pass through the winding portion of the rotor in discrete circumferentially spaced zones and the flux in each such zone is in the same direction. The return flux paths are through portions of the rotor which do not carry windings.

SHORT SUMMARY OF THE INVENTION

The present invention concerns improvements in or relating to electric rotary machines of the flat annular magnetic airgap kind, having a disc-shaped rotor comprising a flat multipolar winding of the series-wave kind arranged in an annular winding band and having at least one ring arrangement of magnetic poles on one face of their airgap, said poles facing said annular widing band, the other face of the airgap being defined either by a similar plurality of magnet poles or by a corresponding plurality of yoke magnetic lugs.

Machines according to the present invention are specially, though not limitatively, of advantage when the magnetization of the field inductor structure is provided from the supply of an electrical current through coils wound around parts of the magnetic field circuit. When such a magnetizing scheme is used in a straightforward fashion in rotary electrical machines of the above defined kind, the lack of space between the polar lugs does not permit a satisfying number of turns in said energising coils, so that the overall efficiency goes down unless more cumbersome machines are provided which is of course a serious drawback too. In contradistinction, machines according to the present invention gain ample space for housing satisfactorily efficient magnetizing coils. From another point of view, machines using permanent magnet inductor structure and of the same kind, are relatively expensive as a plurality of high induction magnets is used in their conventional designs. Machines according to the invention and using permanent magnet field structure permit a substantial economy on that part of their assembly.

DRAWINGS

FIGS. 1 and 2 show a first illustrative embodiment of a machine according to the invention, FIG. 1 being a cross-section view along line I—I of FIG. 2, and FIG. 2, being a cross-section of FIG. 1 in the plane (D) of said FIG. 1;

FIGS. 3 and 4 respectively show two partially shown variations of the structure of FIGS. 1 and 2;

Figure 7:
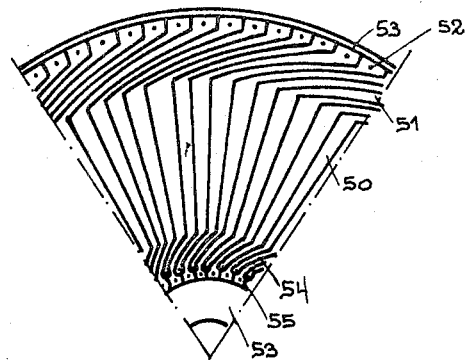
Figure 8:
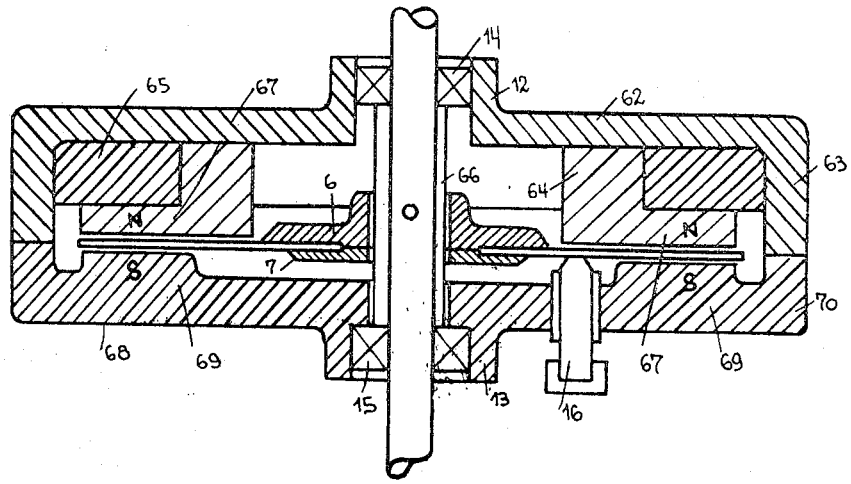
Figure 9:
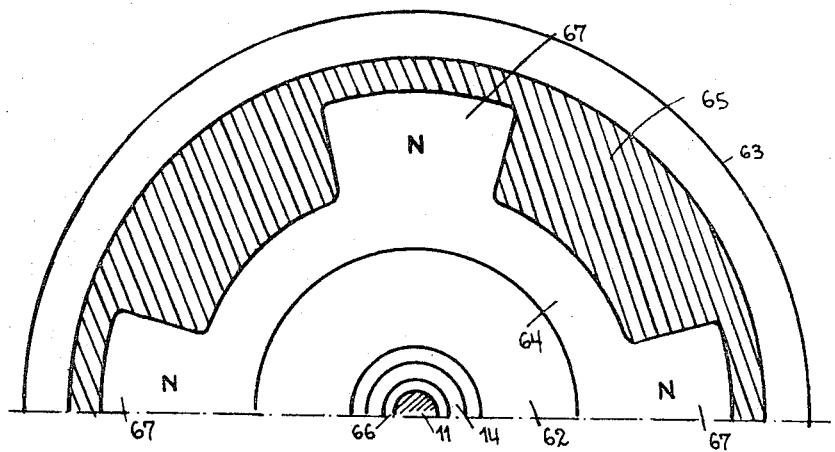
Figure 10:
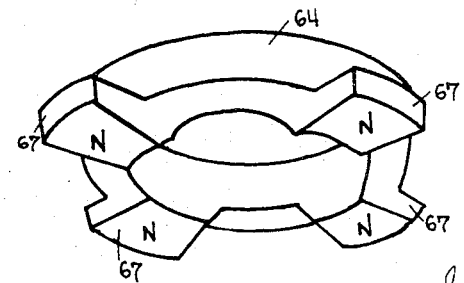

FIG. 7 illustratively shows a partial view of one possible embodiment of a flat rotor armature winding for such machines as above;

FIG. 8 in an elevation cross-section view, and FIG. 9, in a partial transversal view, shows a second illustrative embodiment of a machine according to the invention; and, FIG. 10 shows an embodiment of the field inductor magnetic structure of the machine in FIGS. 8 and 9, in a perspective view.

The drawings refer to a machine which would normally be said octopolar, i.e. which would comprise, on one face at least of its airgap, four pairs of magnetic poles arranged in a ring facing the winding band of the rotor, said eight poles being of alternate magnetic polarities or denominations around said ring. The magnetic flux would be heteropolar within the airgap of such a conventional machine. The armature winding is consequently made in accordance with a well-known series-wave pattern with a winding pitch corresponding to such an eight-pole field structure. Illustratively, FIG. 7 shows a portion of such a flat winding when made in printed-circuitry technique (which is not at all imperative, the armature winding can equally be made of conventional insulated wires arranged in flat coil formation if desired): each face of a disc-shaped carrier insulating material 53 carries the required number of half-turn conductors. Each half-turn conductor comprises for instance a mid portion 50 substantially generally radially orientated extending both ways by integral curved or slanted portions, 51 and 54 ending in terminals 52 and 55. The winding comprises two such layers with the orientation of the curved or slanted portions of the half-turn conductors reversed from one face to the other one (when seen from a single side of the armature) and having their end terminals in due registration from layer to layer. All pairs of such registering terminals are electrically interconnected for completing the electrical circuit of such a series-wave winding. Of course, such a schema is only illustrative.

Figure 1:
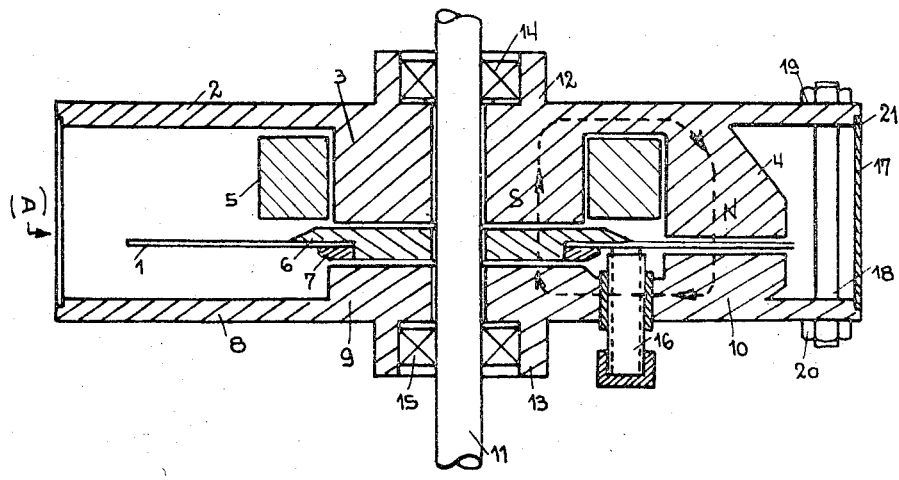
Figure 2:
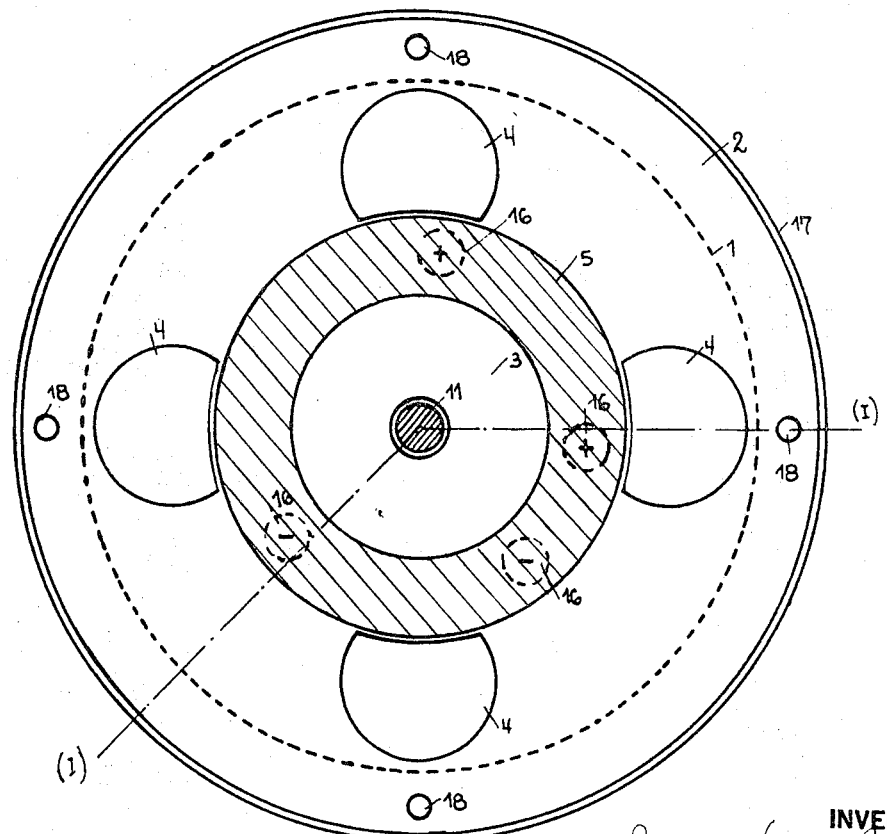

In the embodiment illustrated in FIGS. 1 and 2, the machine comprises such an eight-pole flat annular winding arranged in its winding band on the rotor disc 1 secured by such hub parts as 6 and 7 on the shaft 11. Detail of the mechanical arrangement is not shown as it is conventional per se: for instance part 7 can be threaded in part 6 which is secured to the shaft 11. Said shaft 11 is mounted to rotate in bearings 14 and 15 and its axial positioning is ensured by any appropriate known means.

The magnetic structure comprises, on one side of the airgap, a circular magnetic plate 2 machined, and for instance moulded, for presenting a cylindrical magnetic hub 3 and four polar lugs 4 the airgap facing planes are clearly shown in FIG. 2. The radial axes of said lugs are uniformly angularly spaced around the ring they define. The magnetic hub 3 is bored with an axial duct for enabling the passage of the shaft 11 and is further provided with a central axial sleeve 12 for housing the bearing 14. The part of the magnetic field structure located on the other side of the airgap is similar to the first above-described one, comprising a circular magnetic plate 8 machined with a cylindrical central hub 9 and four polar lugs 10, said hub 9 and lugs 10 facing the hub 3 and the lugs 4. The plate 8 is also provided with a central axial sleeve 13 for housing the bearing 15.

Figure 5:
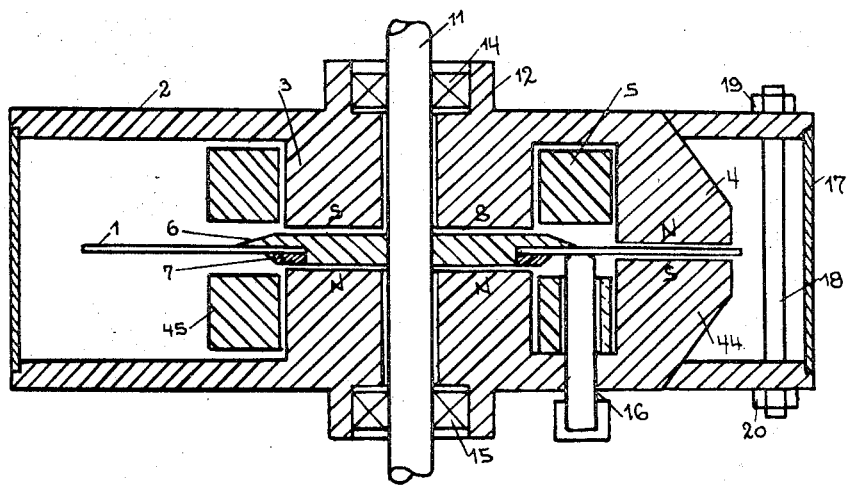
FIG. 5 shows in cross-section elevation view a modification of the machines of FIGS. 1 and 2.

It is not however imperative that the axial lengths of the hub 9 and the lugs 10 equal those of the hub 3 and the lugs 4; preferably said axial lengths will be made shorter in order to reduce the overall volume of the machine. Of course, if such a volume is not estimated critical, and both parts of the magnetic structure made from a mold, it is of advantage in mass production at least to make the two parts of same dimensions so that a single moulding operation suffices for all parts of such magnetic field structures. FIG. 5 shows such a modification.

Holes are provided in plate 8 (which could as well been provided in plate 2 if desired) for the housing of bushings carrying the brushes 16; when the machine is used as a motor several pairs of brushes may be provided, for instance two pairs of positive (+) brushes and negative (−) brushes as shown. The angular spacings of these brush pairs are illustrated for a eight-pole machine.

A coil 5 is shown wound around the magnetic hub 3. Said coil can occupy the nearly whole space existing between the hub 3 and the polar lugs 4. Consequently, said coil can be of an important number of turns whilst being easy to house in the structure. With such an arrangement, the hub 3 provides a single inductor field member in the complete magnetic stator structure. In such a case, the hub 3 and the associated current supplied coil 5 constitute the generator device for a magnetic flux which, through the relatively low reluctance paths of the lugs 4, reaches the airgap as an homopolar flux with respect to the annular winding band, passes through said band and closes through the hub 3 as being guided back through the air-gap by the magnetic inactive structure facing the active one on the other side of the armature. In the representation of FIG. 1, it is assumed that the direction of the direct electrical current passing in the coil 5 is such that the homopolar flux is North in the path through the winding band whereas the flux coming back to the hub 3 is South, as illustrated by a flux loop shown in the said FIG. 1.

Figure 6:
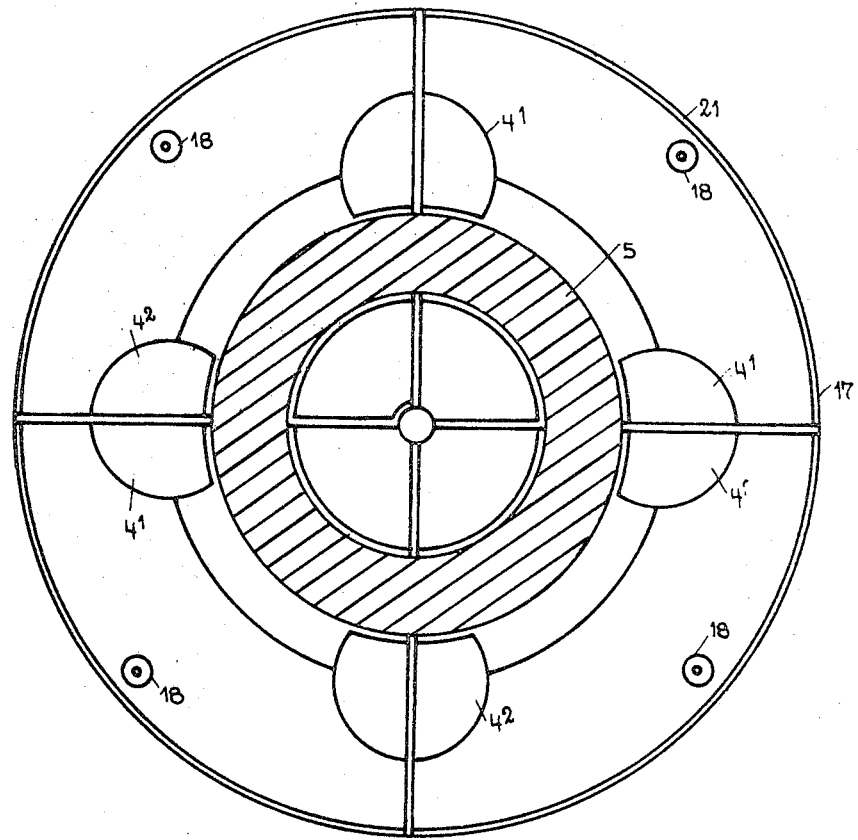
FIG. 6 shows a cross-section transversal view of a further modification of the structure of FIGS. 1 and 2.

FIG. 6 shows a modification which may be of advantage, mainly for machines of a substantial power, consequently of a substantial volume of magnetic material. As seeable, such a modification consists of cutting the magnetic circuit in a number of parts equal to the number of polar lugs such as 4 so that, after assembling such subdivision parts, each polar lug is made of two equal juxtaposed portions with a radial slot. The intrinsic advantage of divided poles is well known per se.

The two parts of the stator structure are joined together, as shown, by means of a thin cylindrical spacer 17, either magnetic or not, clamped between the edges of the plates 2 and 8 for instance by means of bolts as 18 and nuts as 19 and 20. Said cylinder 17 may be replaced by a plurality of struts if desired. Vent holes may be provided in the plates and/or the cylinder.

The energisation of the field structure is merely obtained from feeding coil 5 with an appropriate electrical current. Said current may be a direct current obtained for instance from the interposition of a rectifying circuit between the coil terminals and the A.C. mains. However, when the magnetic material is suitably chosen, for instance as known in a silicon-iron alloy, the rectifier may be omitted and the coil fed straight from the mains.

Of course, in a motor, the brushes will be supplied with D.C. or rectified current under a voltage adapted to the impedance presented by the armature winding to the brushes.

Whereas one may consider that coil 5 could be replaced by as many elementary coils as are polar lugs, around such lugs, said elementary coils being suitably series-connected with respect to the supply, one must observe that actually a division of the coil 5 into such elementary coils will reach, for a relatively high number of pole lugs (for instance six or seven poles of the same magnetic polarity, corresponding to twelve or fourteen poles in conventional machines) a point at which the efficiency will necessarily be lower than with the single coil 5, not to speak of the complication of assembly:

It is to be understood that the very purpose of the invention, as applied to wound field pole machines lies in the fact that it gives the possibility of obtaining efficient machines because the energizing coil may occupy a relatively large space in the structure, and consequently can be made of a high number of turns. In prior art machines, each polar lug, whether of positive or negative magnetic denomination or polarity, was surrounded with an elementary coil. In cylindrical airgap machines, such an arrangement was without much inconveniency because, from the cylindrical geometry proper, space was available for giving to each of said elementary coil a sufficient number of turns. In flat annular airgap machines, on the other hand, space is quite limited in this respect, unless it is agreed to unduly enlarge the diameters of the disc-shaped component members, which is obviously a very serious drawback. The provision, according to the invention, of a structure acting with an homopolar magnetic flux in the airgap, consequently cancelling one pole lug over two with respect to the prior art machines, supplies the sufficient space for setting elementary coils around the maintained lugs provided the number of such lugs is relatively low, corresponding to the former four, six, or even eight pole machines, as two, three or four actual magnetic lugs are preserved. As the number of such preserved polar lugs increases, lesser space remains for elementary coils. However, as apparent, when according to a further feature of the invention, the structure is such as to present a single energizing portion, surrounded by a single coil, room or space is always appropriate for placing a coil of high number of turns, and consequently obtaining a high intensity of magnetic flux without substantially increasing the volume of the whole machine, especially in the radial direction. More definitely, the possibility created by the present invention of utilizing high power energizing coil arrangement overcompensates the loss of induction in the airgap due to the omission of pole lugs of one magnetic polarity.

All the more, when high induction conditions in the airgap are required, for what may be called "high flux" machines, such a scheme as shown in FIG. 5 is possible without departing from the spirit and scope of the invention. The number of polar lugs remains unchanged on each face of the airgap, i.e. one-half of the number of the polar pitches in the armature winding. But the lower (in the drawing) polar lugs 44 are too energized from an additional energizing coil 45 arranged around the hub part of that portion of the magnetic circuit in the stator. Said coil 45 is supplied with a current of such a direction that the lugs 44 present to the facing lugs 4 an opposite polarity of magnetic flux.

Figure 3:
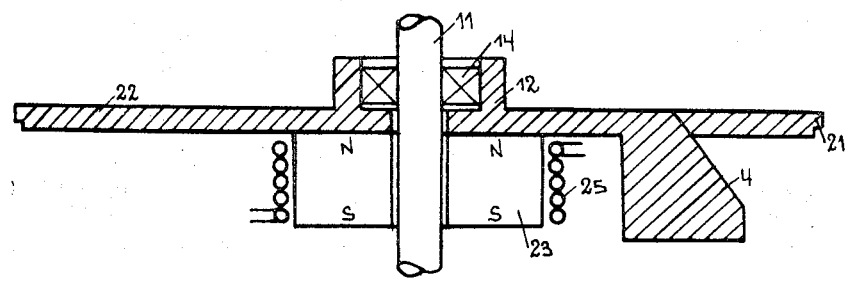

Application of the invention to permanent magnet field inductor machines may also be of advantage, specially for machines with a relatively high number of pairs of poles (defined by the pitch of their armature windings). In FIG. 3 for instance, the hub corresponding to the hub 3 of FIG. 1 is made from a single axially magnetized magnet. Firstly, the reduction of cost is sensible, secondly, the magnetization process only requests a single coil such as 25 wherein for magnetizing the magnet 23 short condenser discharges of high intensity of current will be applied as conventional.

Figure 4:
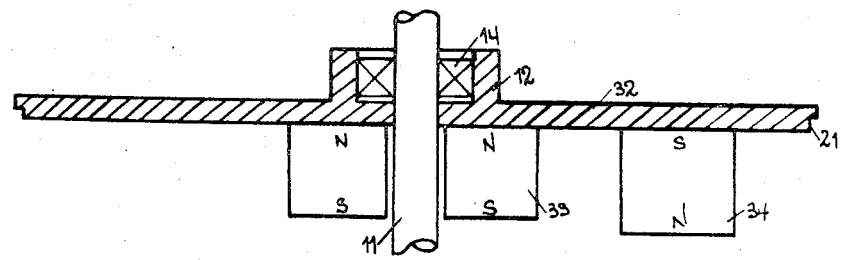

Also, if required, the soft magnetic polar lugs 4 of the FIG. 1 can be, in such permanent magnet machines be replaced by magnet lugs such as shown at 34 in FIG. 4, the axial magnet being either preserved at 33 or, as not shown but obvious, replaced by a mere hub of soft magnetic material. Again in this case, a substantial economy occurs.

But the more important advantage of applying the invention to a permanent magnet machine is the possibility of volume reduction in the radial direction whilst preserving a suitably fair efficiency.

In the embodiment of the class disclosed as an illustrative example in FIGS. 8 and 9, the energizing coil 65 surrounds a cylindrical part 64 of a soft magnetic material circuit the polar lugs 67 of which directly extend from a central hollow axial cylinder portion 64 (same cylinder as the one carrying the coil). As shown in the half-view of FIG. 9, such polar lugs clearly correspond to the polar lugs 4 of FIG. 1. FIG. 10 gives a perspective view of the part constituted by cylinder 64 and polar lugs 67. The housing of the machine is made entirely of soft magnetic material, upper plate 62 being provided with an annular edge 63 cooperating in the assembly with a corresponding edge 70 of the lower plate 68. Such an arrangement ensures both the mechanical spacing defining the airgap and the completion of the magnetic flux circuit for the return of the flux which passes through the airgap. Plate 68 presents polar portions 69 facing the polar lugs 67 of the upper portion of the magnetic circuit in the machine. The thickness of the plates 62 and 68 and their edge walls 63 and 70 is such that the flux is offered a relatively low reluctance path for its closure.

Such an arrangement, wherein the central part of the machine is more spacious than in the former one, further enables a greater space for the coil 65, hence an higher efficiency from an increase of the number of turns in said coil than that of the precedingly described embodiments.

Illustratively, in FIG. 8, it is shown the shaft equipped with a pinned sleeve 66 for fixing the axial position of the shaft with respect to the inductor stator structure.

A further advantage of the structure according to FIFGS. 8 and 9 is that it enables a larger coverage of the polar lugs with respect to the armature winding in the radial direction thereof.

Modifications as provided for the embodiment of FIGS. 1–2 may be directly applied to the embodiment of FIGS. 8 to 10, if required.

I claim:

1. An electric flat annular airgap rotary homopolar machine having a disc-shaped rotor and a series-wave multipolar winding in an annular winding band thereon, and an inductor field structure distributed on both sides of the airgap, said field structure comprising first means on one side of the airgap for creating a flux pattern through said winding band which pattern consists of a plurality of equispaced zones of single magnetic polarity, second means on the opposite side of said airgap for at least receiving the said magnetic flux from said zones on the other side of said airgap, said first and second means further including magnetic means for closing the magnetic flux back from said second means to said first means along a magnetic path spaced radially from said winding band.

2. Electric rotary machine according to claim 1, wherein said first and second means include facing arrangements of equi-spaced polar lugs defining said zones in said airgap.

3. Electric rotary machine according to claim 2, wherein the number of polar lugs in each of said arrangements equals one-half the number of winding polar pitches in the series-wave winding of the rotor.

4. Electric rotary machine according to claim 2, wherein the dimensions of said polar lugs are identical in both the said first and second means.

5. Electric rotary machine according to claim 2, wherein the dimensions of said polar lugs in said second means are reduced in height with respect to the dimensions of said polar lugs in said first means.

6. Electric rotary machine according to claim 2, wherein said polar lug arrangements are carried on magnetic disc-shaped yoke plates.

7. Electric rotary machine according to claim 6, wherein in at least said second means, said polar lugs are integral to said yoke plate.

8. Electric rotary machine according to claim 6, wherein in at least said first means, said polar lugs are integral radial extensions of a hollow magnetic cylinder coaxial to and secured to said yoke plate.

9. Electric rotary machine according to claim 6, wherein further magnetic means in said first and second means comprise annular magnetic parts facing one another coaxial with and distinct from said annular area of said airgap.

10. Electric rotary machine according to claim 9, wherein said parts are innerly coaxial to the said annular area and the said polar lug arrangements.

11. Electric rotary machine acording to claim 9, wherein said parts include parts which are outwardly coaxial to the said annular area and the said polar lug arrangements.

12. Electric rotary machine according to claim 11, wherein the said outwardly coaxial parts constitute flanges of the casing of the machine.

13. Electric rotary machine according to claim 10, wherein in at least the first means an electrical winding coil surrounds said innerly coaxial part.

14. Electric rotary machine according to claim 11, wherein in at least the said first means an electrical winding coil is housed within the space inner to said outwardly coaxial part.

15. Electric rotary machine according to claim 9, wherein said polar lugs are each surrounded by an electrical winding coil and all the coils are series-connected for a flow of electrical current in a single direction throughout.

16. Electric rotary machine according to claim 11, wherein in at least said first means, said innerly coaxial part comprises a hollow axially magnetized permanent magnet.

17. Electric rotary machine according to claim 16, wherein said innerly coaxial part in said second means comprises a hollow axially magnetized permanent magnet of same axial magnetization in the axial direction of the machine.

18. Electric rotary machine according to claim 16, wherein further each polar lug in said first means each comprises a permanent magnet.

19. Electric rotary machine according to claim 2, wherein the said first and second means each comprises as many segments of magnetic circuit as are polar lugs in each arrangement of polar lugs, each of said segment including half-polar lugs at the radial edges thereof.

20. A homopolar electric rotary machine of the flat annular airgap type comprising the combination of a disc-shaped rotor having a series-wave flat multipolar winding in an annular winding band thereon, and inductor means for creating a flux pattern through said winding band which pattern consists of a plurality of equispaced zones of the same magnetic polarity.

21. An electric rotary machine according to claim 20, wherein each one of said zones substantially spans over the span of one winding polar pitch in said winding, and each spacing between two consecutive ones of said zones also substantially spans over the span of one winding polar pitch.

22. An electric rotary machine of the flat annular airgap kind having a disc-shaped rotor comprising a series-wave flat multipolar winding in an annular winding band thereof and an inductor field magnetic structure comprising on at least one face of said airgap a circularly arranged series of equi-spaced polar lugs facing said winding band, wherein said polar lugs are of identical polarity magnetization and of a number equal to one-half the number of winding polar pitches in said multipolar winding, whereby all magnetic flux passing through said annular winding band from said field magnetic structure is of the same polarity.

23. An electric rotary machine of the flat annular airgap kind having a disc-shaped rotor comprising a series-wave flat multipolar winding of an even number of winding polar pitches in a winding annular band thereof, and an inductor field structure comprising on at least one face of said airgap a circularly arranged series of equi-spaced identical area polar lugs facing said winding band, each polar lug substantially extending over the span of a winding polar pitch, wherein said polar lugs are of identical polarity magnetization in a series and of a number equal to one-half the number of winding polar pitches in said winding, whereby all magnetic flux passing through said winding annular band from said inductor field structure is of the same polarity.

References Cited

UNITED STATES PATENTS

| | | | |
|---|---|---|---|
| 547,069 | 10/1895 | Gorges | 310—178 |
| 2,088,729 | 8/1937 | Taylor | 310—178 |
| 3,023,335 | 2/1962 | Burr | 310—268 |
| 3,093,763 | 6/1963 | Sargeant | 310—268 |
| 3,144,574 | 8/1964 | Henry-Baudot | 310—268 |
| 3,383,535 | 5/1968 | Lohr | 310—268 |

MILTON O. HIRSHFIELD, Primary Examiner

R. SKUDY, Assistant Examiner

U.S. Cl. X.R.

310—154, 208, 237, 268